Sept. 12, 1961   K. SCHINDLER   2,999,677
SPRING CONSTRUCTION
Filed May 2, 1960
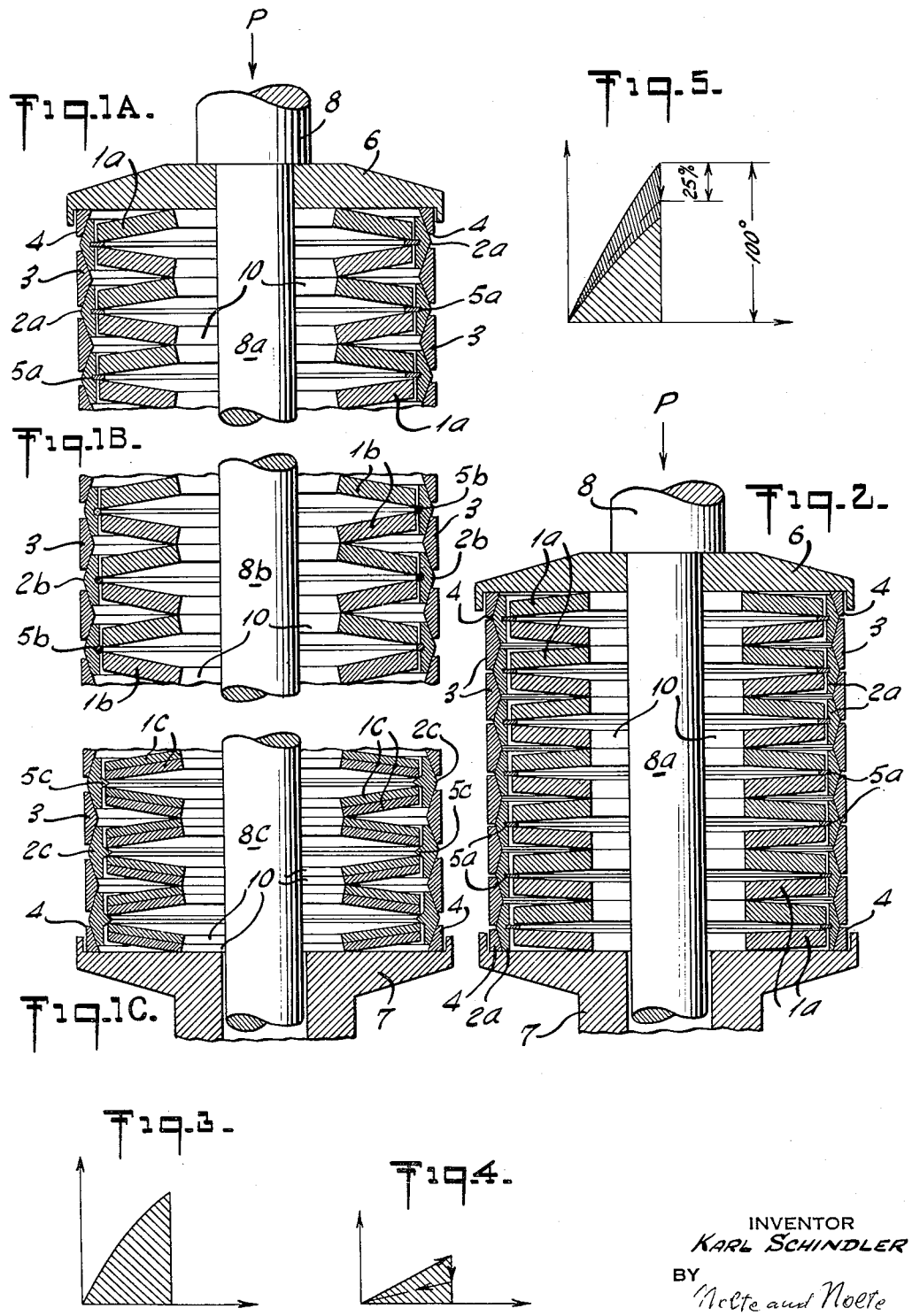
INVENTOR
KARL SCHINDLER
BY
Nolte and Nolte
ATTORNEYS … # 2,999,677
SPRING CONSTRUCTION
Karl Schindler, Frankfurt am Main, Germany, assignor to Henschel-Werke G.m.b.H., Kassel, Germany
Filed May 2, 1960, Ser. No. 26,138
Claims priority, application Germany May 2, 1959
10 Claims. (Cl. 267—2)

This invention relates in general to springs and in particular to a new and useful spring column including a plurality of dish-shaped spring elements arranged within and cooperating with a plurality of ring-shaped elements.

Conventional springs are known which include a column of elements such as curved thin dimensioned plate members or washers (substantially dish-shaped) which are superimposed one upon the other with adjacent ones inverted with respect to each other. Conventional spring columns have also included a plurality of ring members, that is, annular members having slight thickness and vertical elongation. Known conventional spring columns consist either solely of ring-shaped spring elements or solely of dish-shaped ones. Columns comprising these known structures either singly or in layers have little or no damping action. Columns which are composed entirely of ring-shaped members have a comparatively large intrinsic friction damping, and those columns which include solely dish-shaped springs or washer elements are limited by their lack of natural damping action.

In accordance with the present invention, there is provided a spring column including a combination of ring-shaped spring elements and dish-shaped spring elements which are coupled together in a manner to insure that their loading and releasing actions occur synchronously and are enforced by a mechanical coupling means. The arrangement includes a column of dish-shaped spring elements with alternate elements inverted and each pair of elements being positioned within a ring-shaped spring element having an interior ledge intermediate the height thereof for contacting and separating each of the dish-shaped spring elements. By such an arrangement it is possible in accordance with the invention to achieve a spring column having a damping action which is freely determinable within wide force or loading limits.

Since the spring column constructed in accordance with the invention may have its damping action freely determinable, it is useful in many fields where conventional spring columns are not applicable, one of these fields of application being for vehicle spring arrangements.

In accordance with a feature of the invention the combined spring column consists of internally placed dish-shaped springs and cooperating interior and exterior ring-shaped springs. The interior ring-shaped springs and a pair of dish-shaped springs are coupled together by beads or rings provided on the interior of the interior ring springs. A pair of dish-shaped springs is inverted with respect to one another and their outer peripheries bear at their juncture against the beads or rings on the interior ring-shaped springs. In general, the strokes of the springs coupled in a column are constructed so that they are of equal length. Thus the two dish-shaped springs of a set act synchronously without stressing the coupling means of the exterior annular ring-shaped spring members. The synchronous action of the pair of dish-shaped spring elements and the outer ring-shaped elements applies also to the damping friction forces which arise upon spring deflection on loading and release of the exterior and interior ring-shaped springs at the contacting surfaces thereof.

The ring spring column advantageously includes alternate interior and exterior ring-shaped elements of smaller and larger diameter, respectively. The interior surfaces of the outer or exterior ring-shaped springs are beveled to a central portion of smallest diameter which abut against similar exteriorly contoured surfaces of the smaller diameter interior ring-shaped springs which are arranged between each of the larger diameter elements. The annular ring members move relative to each other by movement of the exterior surfaces of the interior smaller diameter ring-shaped springs with respect to the interior beveled surfaces of the larger diameter ring-shaped springs.

An important feature of the present invention is that the combined spring column, which includes the combination of the ring-shaped spring elements and the dish-shaped spring elements, is synchronized in respect to the frictional forces which will effect their movement and they are coupled together so that the dish-shaped spring elements equalize the forces acting on the ring-shaped elements. With such a construction the dish-shaped elements act upon the ring-shaped elements to insure that they are always released after they are unloaded and never become stuck, which was frequently the case with conventional spring columns composed entirely of the ring-shaped elements alone.

Accordingly, it is an object of this invention to provide an improved spring column construction.

A further object of the invention is to provide a spring column comprising cooperative dish-shaped and ring-shaped spring elements.

A further object of the invention is to provide a spring column comprising a plurality of pairs of dish-shaped spring elements with one element in each pair being inverted and including outer ring-shaped elements against which the outer peripheries of said dish-shaped elements abut.

A further object of the invention is to provide a spring column comprising a column of ring-shaped spring elements including alternate elements of larger diameter having interior walls converging to a central portion of narrowed diameter and alternate spring elements of smaller diameter having exterior walls similarly but oppositely shaped with the portions above and below the area of large external diameter abutting against the lower and upper portions of the next adjacent rings of larger diameter, respectively; and including a plurality of dish-shaped spring elements arranged in pairs with one element of each pair being inverted in respect to the other, the dish-shaped elements being coupled to the ring-shaped elements of smaller diameter through a beaded portion thereof defined centrally on the interior surface of said smaller diameter ring-shaped elements.

A further object of the invention is to provide a spring column which is simple in design, rugged in construction, and economical to manufacture.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

In the drawings:

FIG. 1A is a transverse section of one embodiment of a spring column constructed in accordance with the invention with the spring elements shown in an unloaded or released position;

FIG. 1B is a transverse section of a spring column similar to FIG. 1A, but showing an alternate embodiment of spring elements;

FIG. 1C is a section similar to FIGS. 1A and 1B, but showing another embodiment of spring elements;

FIG. 2 is a view similar to FIG. 1A indicating the spring column in a loaded position;

FIG. 3 is a diagram indicating the spring path in relation to force;

FIG. 4 is a diagram indicating work done by the spring column; and

FIG. 5 indicates a work diagram obtained by a combination of the diagrams indicated in FIGS. 3 and 4.

Referring to the drawings in particular, the invention as embodied therein includes a plurality of substantially flat spring elements which are sometimes referred to as disc-shaped or more properly, dish-shaped spring elements or washers.

In accordance with the invention, dish-shaped elements 1a, 1b and 1c of FIGS. 1A, 1B and 1C, respectively, are of an external diameter slightly smaller than the internal diameter of respective ring-shaped elements or members 2a, 2b and 2c.

In the embodiment of the invention shown in FIG. 1A, the internal ring-shaped spring elements 2a include a central interior groove in which is positioned a flat washer element 5a. A set of dish-shaped spring elements 1a includes a lower element which is placed within the internal ring 2a with its upper marginal edge abutting against the washer 5a, and an upper element which is inverted in respect to the lower element and its exterior lower marginal edge abuts against the top surface of the washer 5a.

In another embodiment, shown in FIG. 1B, an internal ring 2b is used in the same spring column, instead of the washer member 5a of FIG. 1A there is provided an internally projecting bead or weld 5b against which the upper marginal edge of the lower dish-shaped spring element 1b and the lower marginal edge of the upper spring element abut.

In a third embodiment, illustrated in FIG. 1C, an internal ring 2c includes a substantially triangularly shaped inwardly projecting central portion 5c against which the upper marginal edge of the lower dish-shaped member and the lower marginal edge of the upper ring-shaped member 1c abuts in each set.

It should be appreciated that the dish-shaped ring elements may all comprise two separate plate or washer elements 1c as shown in FIG. 1C, for each lower member in a set and two separate plate or washer elements 1c for each upper element in a set.

The internal ring members 2a, 2b and 2c all include pointed or beveled outer upper and lower walls which meet at a central point of larger external diameter. The internal ring elements 2a, 2b and 2c are in sliding contact with lower and upper walls respectively of the next adjacent upper and lower external ring elements 3. The external ring elements 3 are similarly beveled so that upon loading of the spring columns the external elements 3 move in sliding contact with the respective internal elements 2a, 2b and 2c. Downward movement of the rings such as caused by the loading force causes an outward give by the extrenal ring elements 3 and the frustoconical surfaces of the internal and external ring elements slide relatively to each other.

The spring columns are supported between lower flanged cylinder members 7 and upper flanged support or retaining plates 6. The extreme upper and lower external ring elements 4 are substantially half the size of the other external ring elements 3. The dish-shaped spring elements 1a, 1b and 1c include aligned central openings 10 which accommodate respective small diameter portions 8a 8b and 8c of piston rod members 8. The rod members 8 also extend through openings in the support plates 6 and into central openings in the cylinder members 7. The load is applied as indicated by the arrows and the designations P.

When such a load is applied, the parts assume the position indicated in FIG. 2 (showing the elements of FIG. 1A) in which relative sliding movement occurs between the outer faces of the internal rings 2a and the inner faces of the external rings 3. The dish-shaped spring elements are compressed or flattened as indicated. The inwardly projecting portions 5a which may be of any chosen cross section, for example square, circular, triangular, etc. act to retain the edges of the dish-shaped spring elements 2a in alignment with its associated internal ring element 2a so that loading and unloading between each of the elements is synchronized. The effect is identical with respect to the embodiments of FIGS. 1B and 1C, shown in their unloaded portions only.

In the diagram of FIG. 3 the path of deflection and the force of the dish-shaped spring column are indicated. As is well known, a dish-shaped spring column, especially a single layer one, has a low or almost zero damping. In FIG. 4 there is illustrated diagramatically the work of a ring-shaped spring column. The area circumscribed by the loading and release of the springs, which is indicated doubly hatched, shows schematically a comparatively high intrinsic damping. In FIG. 5 there is indicated a diagram composed of FIGS. 3 and 4 which corresponds to the work of the combined spring columns as constructed in accordance with the invention. From the figure, it can be seen that th amount of damping action can be brought into the desired proportion with respect to the entire spring column action which may be the one desirable for a certain purpose; for example, for vehicle spring action where damping is about 25% of the spring action.

While a specific embodiment of the invention has been shown to describe and illustrate the application of the invention principles, it will be understood that the invention may be embodied otherwise without departing from such principles.

What is claimed is:

1. A spring column comprising a plurality of ring-shaped spring elements including alternate external and internal members having respective interior and exterior wedge-shaped surfaces in sliding contact with each other whereby loading causes relative movement of said internal and external members and expansion of said external members, said internal members each including a central inwardly projecting portion, and a set of dish-shaped spring elements cooperating with each of said internal members, including one dish-shaped element inverted above the other and having their opposite faces abutting at the peripheries thereof against said inwardly projecting portions of said internal members.

2. A spring column according to claim 1, wherein said dish-shaped elements are provided each with a central opening, further comprising flanged retaining members on opposite ends of the column having each an opening therein, and a rod member traversing said openings of the dish-shaped elements and said openings of said flanged retaining members for uniform load distribution by said rod member against one of said retaining members and all of said spring elements.

3. A spring column according to claim 1, wherein each of said dish-shaped elements includes at least two separate nested dish-shaped members.

4. A spring column according to claim 3, wherein said external members are axially supported at each end of the column and centering of the spring column is effected by said internal members disposed in a radially intermediate position between said dish-shaped members and said external members.

5. A spring column comprising a flanged member having an opening therein, a plurality of ring-shaped spring elements including alternate external and internal members, said external members having wedge-shaped interior surfaces converging at a central portion of smallest diameter while said internal members have wedge-shaped exterior surfaces converging at a central portion of greatest diameter, the lower beveled faces of said internal members being in sliding contact with the upper beveled faces of the next adjacent lower external members, and the upper beveled faces of said internal members being in sliding contact with the lower beveled faces of the next adjacent upper external members, each of said internal members comprising a central internal supporting ledge, a first set of dish-shaped spring elements having their upper marginal edges abutting against said ledges, a second set of inverted dish-shaped spring elements having their lower marginal edges abutting against said ledges, all of said dish-shaped elements having an opening therein, a flanged retaining member having an opening therein, extending above and contacting the uppermost ones of said external members and of said dish-shaped elements, and a rod member comprising a portion of small diameter extending through said opening of the retaining member, through each of said openings of the dish-shaped elements and through said opening of the flanged member, said rod member further comprising a widened portion which rests on the top face of said retaining member, whereby load is distributed by said rod member against said retaining member and against all of said spring elements.

6. A spring column according to claim 5, wherein each of said dish-shaped elements includes at least two separate nested dish-shaped members.

7. A spring column according to claim 5, wherein said internal members are provided with central interior grooves, and said ledges are formed by annular washer elements inserted in said grooves, the marginal edges of said dish-shaped elements abutting against said washer elements.

8. A spring column according to claim 5, wherein said ledges are formed on said internal members by annular beads having a width large enough to serve as abutments for said marginal edges of the dish-shaped elements.

9. A spring column according to claim 5, wherein said ledges are formed on said internal members by substantially triangular, inwardly projecting portions against which said upper marginal edges of the first set of dish-shaped elements and said lower marginal edges of the second set of inverted dish-shaped elements abut.

10. A spring column according to claim 5, wherein both sets of dish-shaped spring elements comprise superimposed pairs of separate nested dish-shaped members, said ledges are formed on said internal members by substantially triangular, inwardly projecting portions, and wherein the outer top edges of the upper dish-shaped members of said first set of dish-shaped elements and the outer bottom edges of the lower dish-shaped members of said second set of dish-shaped elements abut against said triangular portions.

References Cited in the file of this patent

UNITED STATES PATENTS

| | | |
|---|---|---|
| 1,884,981 | Otto | Oct. 25, 1932 |
| 2,655,935 | Kinzbach | Oct. 20, 1953 |